(12) United States Patent
Qiao et al.

(10) Patent No.: US 11,044,019 B2
(45) Date of Patent: Jun. 22, 2021

(54) METHOD AND DEVICE FOR CHROMATIC DISPERSION COMPENSATION

(71) Applicants: GC Photonics Inc., Nepean (CA); Accelink Technologies Co., Ltd., Wuhan (CN)

(72) Inventors: Lijie Qiao, Nepean (CA); Qinlian Bu, Hubei (CN); Li Xiao, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 0 days.

(21) Appl. No.: 16/410,879

(22) Filed: May 13, 2019

(65) Prior Publication Data
US 2019/0349092 A1  Nov. 14, 2019

Related U.S. Application Data

(60) Provisional application No. 62/670,257, filed on May 11, 2018.

(51) Int. Cl.
*H04B 10/61* (2013.01)
*H04B 10/2513* (2013.01)

(52) U.S. Cl.
CPC ..... *H04B 10/6161* (2013.01); *H04B 10/2513* (2013.01)

(58) Field of Classification Search
CPC ............ H04B 10/6161; H04B 10/2525; H04B 10/25253; G02B 6/29377; G02B 6/29394; G02B 6/29295
See application file for complete search history.

(56) References Cited

U.S. PATENT DOCUMENTS

| 5,602,666 A * | 2/1997 | Ishikawa | G02B 6/29377 |
| | | | 398/147 |
| 5,636,046 A * | 6/1997 | Ishikawa | G02B 6/29377 |
| | | | 385/123 |
| 6,466,341 B1 * | 10/2002 | Lumish | G02B 6/29367 |
| | | | 398/82 |
| 10,225,016 B1 * | 3/2019 | Khaleghi | H04J 14/0256 |
| 2002/0015207 A1 * | 2/2002 | Ooi | H04B 10/25133 |
| | | | 398/147 |
| 2003/0002772 A1 * | 1/2003 | Katayama | H04B 10/25133 |
| | | | 385/15 |

(Continued)

*Primary Examiner* — Tanya T Motsinger
(74) *Attorney, Agent, or Firm* — Teitelbaum & Bouevitch; Neil Teitelbaum (57) ABSTRACT

A tunable optical dispersion compensator (TODC) for providing chromatic dispersion (CD) compensation of optical signals in a plurality of optical channels comprises: a plurality of CD compensation fibers; a tunable optical switch configurable for directing an optical signal in any of the plurality of optical channels to one of the plurality of fibers, dependent on a central wavelength of the optical signal; a first switch configurable for directing all signals in the plurality of optical channels to a first CD compensation fiber, in a first mode of operation, and for bypassing the first CD compensation fiber in a second mode of operation; and, the first CD compensation fiber, wherein the first switch and the tunable optical switch are connected so as to enable combining CD compensation provided by the first CD compensation fiber and CD compensation provided by any one of the plurality of CD compensation fibers.

14 Claims, 9 Drawing Sheets

(56) References Cited

U.S. PATENT DOCUMENTS

| | | | |
|---|---|---|---|
| 2003/0169967 A1* | 9/2003 | Sillard | H04B 10/2519 385/37 |
| 2006/0051039 A1* | 3/2006 | Wei | H04B 10/2531 385/123 |
| 2006/0067700 A1* | 3/2006 | Yamada | H04B 10/25253 398/147 |
| 2006/0133815 A1* | 6/2006 | Fukashiro | H04B 10/25253 398/147 |
| 2006/0193556 A1* | 8/2006 | Frisken | G02B 6/29395 385/27 |
| 2007/0015969 A1* | 1/2007 | Feldman | A61B 5/0066 600/160 |
| 2007/0223926 A1* | 9/2007 | Fukashiro | H04B 10/2525 398/81 |
| 2008/0151377 A1* | 6/2008 | Sekine | G02B 6/29395 359/615 |
| 2009/0060523 A1* | 3/2009 | Qiao | H04B 10/07951 398/147 |

\* cited by examiner

FIG. 11 the estimated span CD based on measured span length is:

$CD_{span} = k_{cd} L_{span}$ where k is the chromatic dispersion value perkilometer in terms of picosecond $CD_{S\,min}$=200ps in our example, and $CD_{S1}$=200ps; $CD_{S2}$=2x200ps; $CD_{S3}$=4x200ps let:

$$N_{min} = \text{int}(\frac{CD_{est}}{CD_{S\,min}})$$

*than*

$CD_{span} = k_{cd} L_{span} = N_S \times CD_{S\,min} + \Delta CD_{span}$ let:

$$M_{sapn} = \text{int}(\frac{\Delta CD_{span}}{50})$$

$CD_{span} = k_{cd} L_{span} = N_S \times CD_{S\,min} + M_{sapn} \times 50 + CD_{error}$

*if* $N_{min} = 0$
$DCF_{S1} = off;\ DCF_{S2} = off;\ DCF_{S3} = off$
*if* $N_{min} = 1$
$DCF_{S1} = on;\ DCF_{S2} = off;\ DCF_{S3} = off$
*if* $N_{min} = 2$
$DCF_{S1} = off;\ DCF_{S2} = on;\ DCF_{S3} = off$
*if* $N_{min} = 3$
$DCF_{S1} = on;\ DCF_{S2} = n;\ DCF_{S3} = off;$
*if* $N_{min} = 4$
$DCF_{S1} = off;\ DCF_{S2} = off;\ DCF_{S3} = on$

.............................

*if* $N_{min} = 7$
$DCF_{S1} = on;\ DCF_{S2} = on;\ DCF_{S3} = off;$

FIG. 12

METHOD AND DEVICE FOR CHROMATIC DISPERSION COMPENSATION

CROSS-REFERENCE TO RELATED APPLICATIONS

The present application claims priority from U.S. Patent Application No. 62/670,257 filed May 11, 2018, which is incorporated herein by reference for all purposes.

TECHNICAL FIELD

The present disclosure relates generally to optical communication systems and, more particularly, to methods and devices for compensation of chromatic dispersion in optical systems.

BACKGROUND

The phenomenon of chromatic dispersion (CD) in optical systems relates to the fact that the speed of light in optical fiber depends on the wavelength of the light. When a pulse of light propagates through a fiber, the pulse width (in the time domain) grows with the distance, the pulse flattens, and its amplitude decreases. Thus, chromatic dispersion is a consideration in designing optical communication systems, especially systems with higher information rates, for example, in a system employing the 4-level pulse amplitude modulation (PAM4) standard, which is more sensitive to the signal-to-noise ratio than earlier standards.

A variety of techniques have been suggested for reduction and compensation of the effects caused by chromatic dispersion. However, the importance of the problem requires new solutions.

SUMMARY

The disclosure relates to a tunable optical dispersion compensator (TODC) for providing chromatic dispersion (CD) compensation of optical signals in a plurality of optical channels. The TODC comprises: a plurality of CD compensation fibers each having a dispersion value associated therewith; a tunable optical switch configurable for directing an optical signal in any of the plurality of optical channels to one of the plurality of fibers, dependent on a central wavelength of the optical signal; a first switch configurable for directing all signals in the plurality of optical channels to a first CD compensation fiber, in a first mode of operation, and for bypassing the first CD compensation fiber in a second mode of operation; and, the first CD compensation fiber, wherein the first switch and the tunable optical switch are connected so as to enable combining CD compensation provided by the first CD compensation fiber and CD compensation provided by any one of the plurality of CD compensation fibers.

Another aspect of the disclosure relates to a method of chromatic dispersion (CD) compensation in an optical system comprising span fiber for propagating optical signals in a plurality of optical channels, and a plurality of tails, each for propagating an optical signal in one of the plurality of optical channels, the method comprising: determining one or more parameters related to chromatic dispersion in the span fiber, determining a remote tail length for each of the plurality of optical channels, and compensating the chromatic dispersion of the span fiber and tail chromatic dispersion on per-channel basis using a tunable compensator, wherein the one or more parameters related to chromatic dispersion in the span fiber and the remote tail length for signals in each of the plurality of optical channels are used for configuring the tunable compensator.

DETAILED DESCRIPTION

Figure 1:
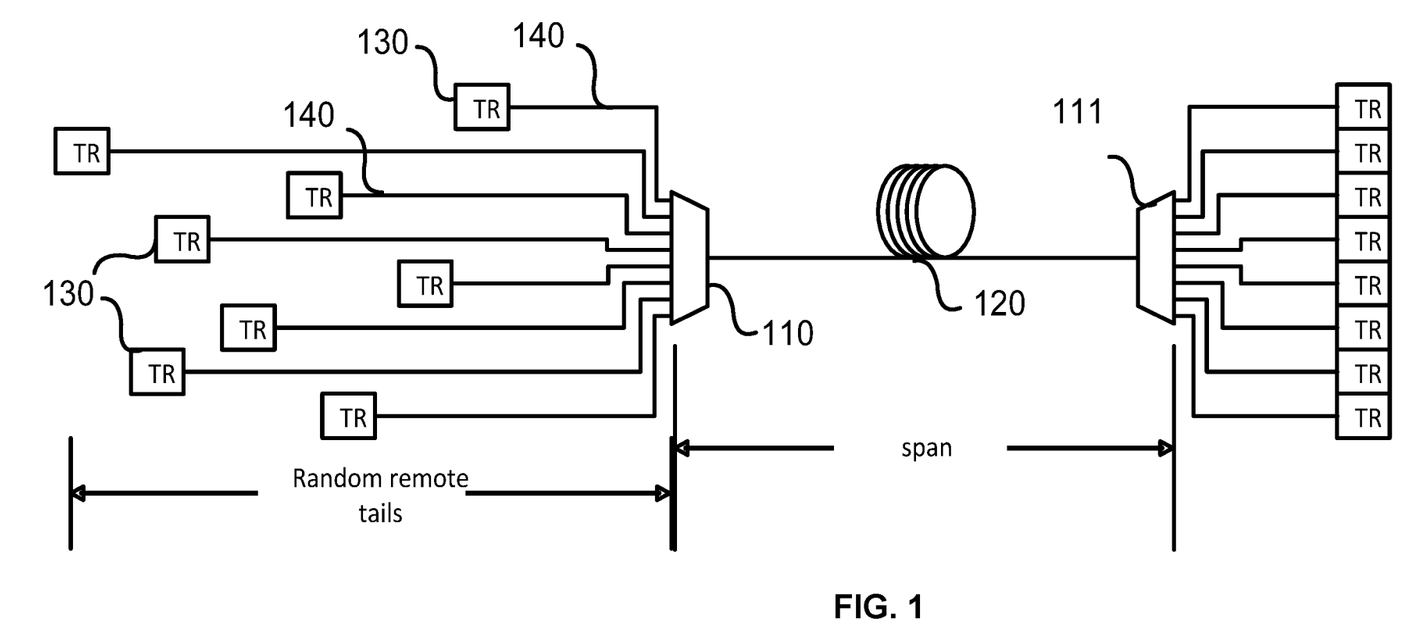
FIG. 1 is a schematic representation of an optical system.

FIG. 1 illustrates a typical Data Center Interconnect (DCI), wherein a plurality of storage and computational devices may be connected to transmitters, receivers, and transceivers, collectively denoted as TRs 130, and so interconnected via a communication network illustrated by MUX/DEMUX devices 110 and span fiber 120. The optical system may be designed for propagating optical signals with wavelengths from 1528 to 1620 nm, each signal within a particular channel which may be characterized a range $\lambda_c \pm \Delta\lambda$, wherein $\lambda_c$ is a central wavelength of the channel.

A typical optical communication system may have remote tails, i.e. optical fibers providing optical signals also referred herein as "light" in one or several but not all channels to or from the system, with unknown lengths in the range of from 0 to 10 km. The system may include a 100 G PAM4 transponder, provide 80 GHz bandwidth, and require +/−100 ps chromatic dispersion tolerance.

The method disclosed herein provides compensation for chromatic dispersion caused by propagation of optical signals in the span fiber 120 as well as for dispersion caused by propagation of the signals in the remote tails 140, i.e. after the exit MUX. The compensation is understood as at least partial compensation.

Figure 3:
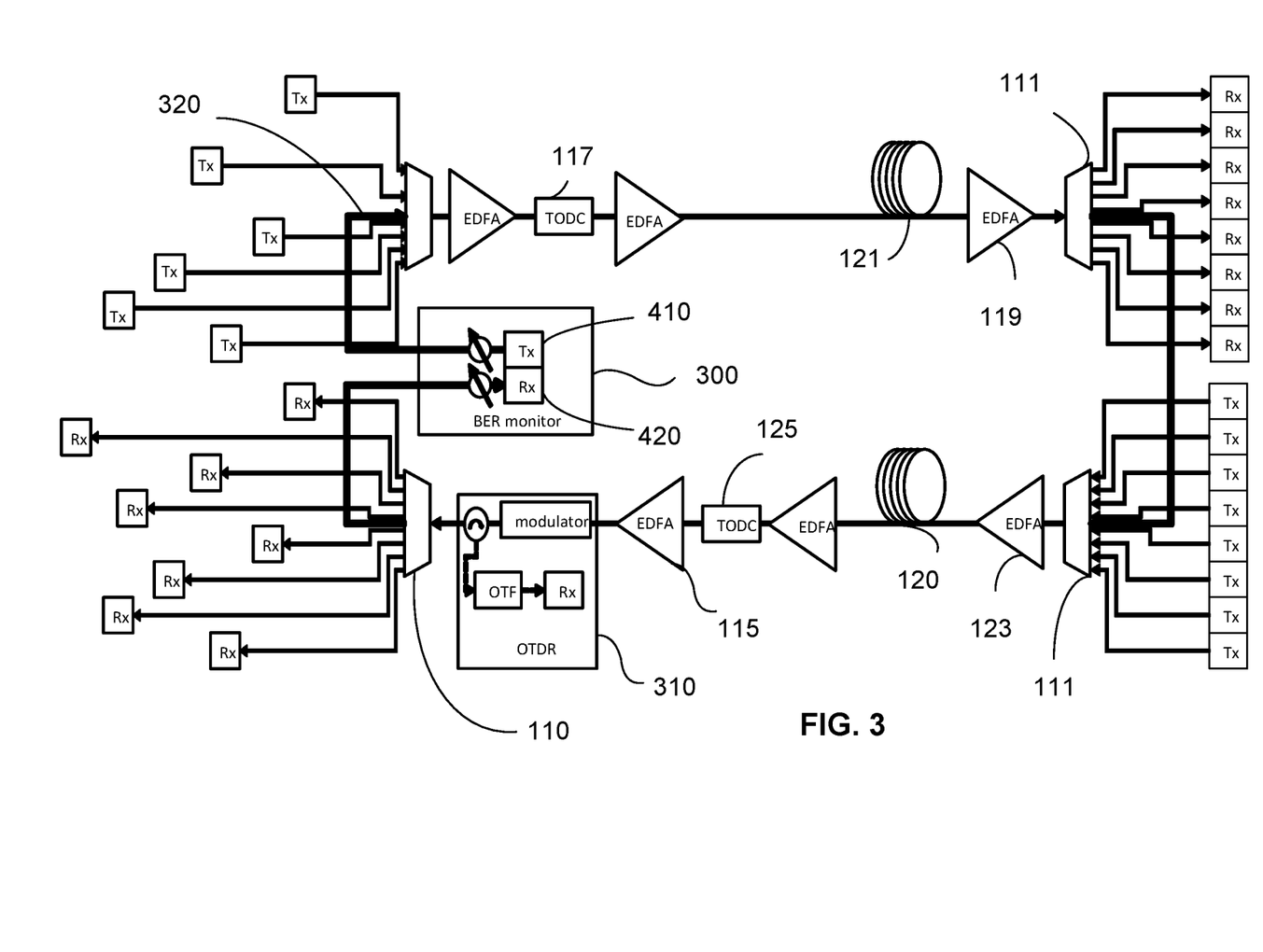
FIG. 3 is a schematic representation of an optical system.

The method will be disclosed as performed in the DCI system of FIG. 1, illustrated in FIG. 3 in more detail. The system includes amplifiers such as an amplifier 115 for compensation of insertion loss, a BER monitor 300, and a Tunable Optical Chromatic Dispersion Compensator (TODC) 310 to compensate the chromatic dispersion.

Figure 2:
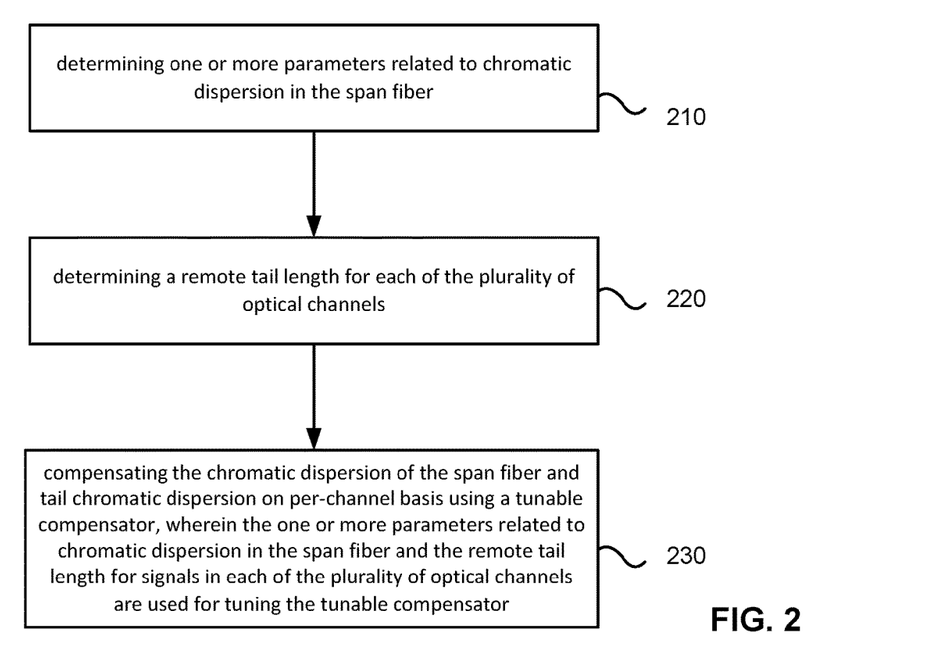
FIG. 2 is a flow chart of a method for chromatic dispersion compensation.

With reference to FIG. 2, the method includes determining (210) one or more parameters related to chromatic dispersion in the span fiber. The chromatic dispersion in the span fiber or the span fiber length maybe determined using a Bit Error Ratio (BER) measuring unit.

Figure 2A:
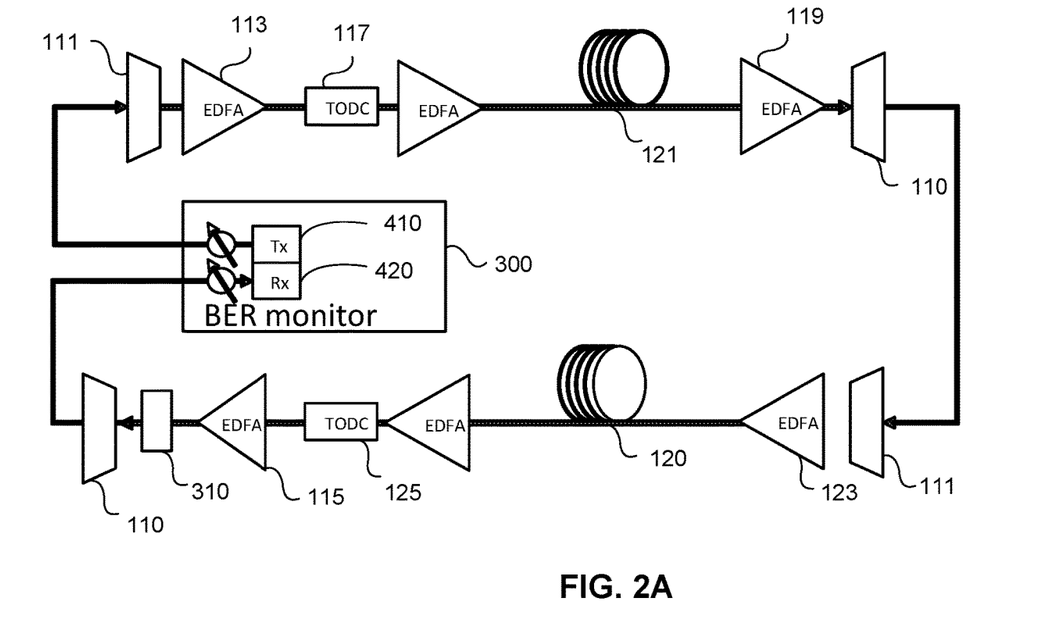
FIG. 2A is a schematic diagram of a BER monitor.

With reference to FIG. 2A, the dispersion compensation system includes a close loop chromatic dispersion compensation based on BER monitoring. A BER monitor 300 includes tunable transmitter 410 and receiver 420. The BER equipment may be a simple BER estimation unit.

Random test signals (e.g. 10110000100111110001010101010101) are generated by the Tx 410 and sent out. A variable optical attenuator (not shown) may adjust the test signal power so that difference OSNR can be achieved, i.e. that the bit error is mainly from the chromatic dispersion not the optical noise, when the signal passes through Mux 111, EDFA 113, TODC 117, span fiber 121, EDFA 119, DeMux 110, Mux 111, EDFA 123, span fiber 120, TODC 125, EDFA 115, Demux 110 and back to the BER monitor 300, to receiver Rx 420. The processor (not shown) of the BER monitor then compares the sent and received signals, and uses the obtained information for controlling the compensator 117.

Advantageously, the TRs 410&420 used for BER monitoring may also be used for the span length measurement. In one embodiment, instead of a simple TR used for BER monitoring, an optical time-domain reflectometer (e.g. such as the OTDR 310 described later with reference to FIG. 4) may be employed to measure the length of the span fiber which can be from 10 km to 80 km. The length value is then used for controlling the compensator.

A signal from the Tx 410 within the BER monitor 300 may be used for measuring the span link length. The Tx 410 may generate pulse with suitable frequency.

The time delay between the send time and the receive time depends on the fiber length. By evaluating the bit shift between the sent and received signals, it is possible to find the distance traversed by the signal. The span is $L_{span}=NC/F$, where C is the light speed in the fiber, F is the modulation frequency, and N is the delay in bits. The signal may be allowed to pass through the span fiber two or more times with the formula for $L_{span}$ adjusted correspondingly.

Turning back to FIG. 2, the method also includes determining (220) a remote tail length 140 (FIG. 1), for propagating a particular channel, more precisely a signal with frequencies within a specific range associated with the channel. This is done for each of the plurality of channels, possibly using a broadband optical time-domain reflectometer (OTDR).

A low cost tunable OTDR may be used to detect the remote tail length for each of the channels. The remote tails are random from 0 to 10 km, causing CD of 0 to 180 ps. The dispersion in the tails may be greater than dispersion tolerance of the Rx at the end of the tail, and so has to be compensated.

With reference to FIG. 3, in an optical system, such as the DCI in our example, an OTDR 310 may be disposed in front of the exit MUX 110 and receive light from a boost amplifier 115. The OTDR 310 may include a modulator 510 (FIG. 4), a circulator 520, an optical filter 530, and a receiver 540. The modulator 510 may be a fast optical switch for cost reduction.

Figure 4:
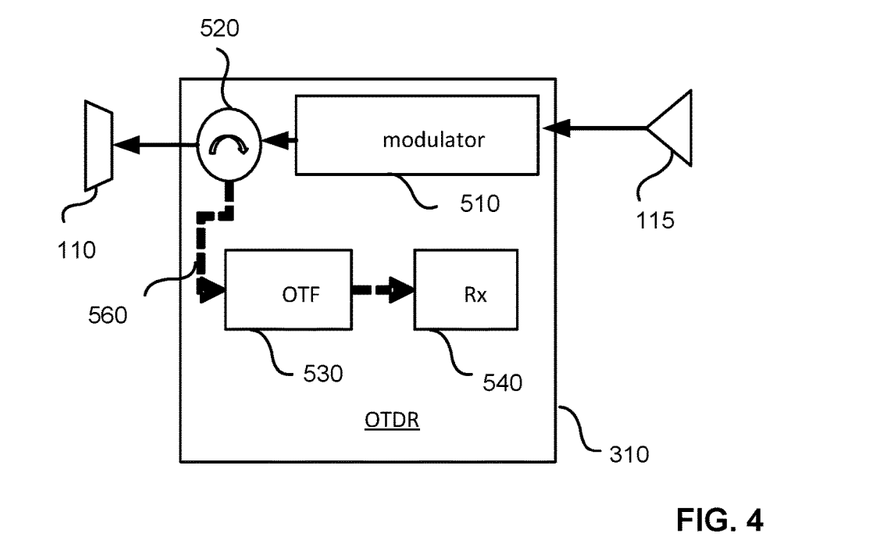
FIG. 4 is a schematic representation of an optical time-domain reflectometer.

The modulator 510 may modulate broadband light provided to the OTDR 310 from an amplifier preceding the OTDR in the optical system, the amplifier 115 in this particular example. The light may be modulated in the time-domain so as to determine the tail lengths the same way as it has been described for the span fiber length, using the bit delay.

The light modulated by the modulator 510 is distributed by the Mux 110 (e.g. an Arrayed Waveguide Grating) to different remote tails so as to reach different TRs 130, wherein the terms "remote tail" and "tail" are used for fibers connecting the exit MUX with end devices illustrated by the transmitters and receivers. Some of the light (shown by a thick arrow 560 in FIG. 4) may be reflected back to the circulator 520 from surfaces of each Rx and then selected by the tunable filter 530. The tunable filter 530 scans across the full wavelength range. Delay times for each channel can be measured by comparing the reflected signal with the modulation signal, and determining the bit shift, so as to obtain a remote tail length for each of the plurality of channels.

Accordingly, a remote tail distance may be determined for each wavelength of interest and so for each particular channel in the system, and then used for chromatic dispersion compensation on per channel basis.

With reference to FIG. 2, determining (210) one or more parameters related to chromatic dispersion in the span fiber and determining (220) remote tail lengths may be performed in any order or in parallel.

The method also includes compensating (230, FIG. 2) the chromatic dispersion of the span fiber and tail chromatic dispersion on per-channel basis using a tunable compensator, wherein the one or more parameters related to chromatic dispersion in the span fiber and the remote tail length for signals in each of the plurality of optical channels are used for controlling the tunable compensator.

There are several technical challenges associated with chromatic dispersion compensation. Most tunable dispersion compensators have insufficient tuning range for accommodating high bandwidth/channel-spacing ratios. Random channel dispersion requires individual channel dispersion compensation. A non-channelized, tunable dispersion compensator based on a wavelength selective switch (WSS) is disclosed herein for chromatic dispersion compensation on per-channel basis.

Figure 5:
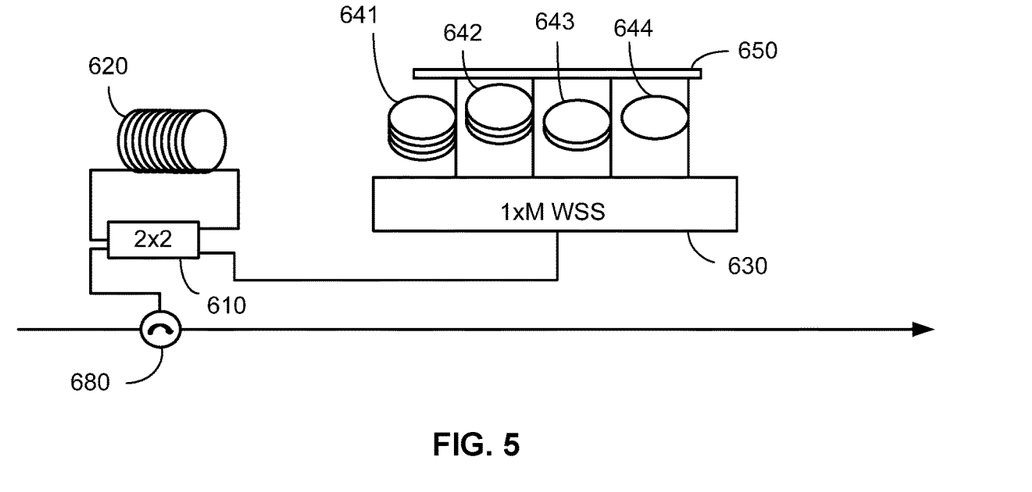
FIG. 5 is a schematic diagram of an embodiment of the compensator.

FIG. 5 illustrates an embodiment of the tunable optical dispersion compensator (TODC) 117 for chromatic dispersion (CD) compensation of optical signals in a plurality of optical channels.

The TODC 117 uses dispersion compensation fibers (DCF) known in the industry. When light propagates through a fiber, the velocity is a nonlinear function of the wavelength. The chromatic dispersion is also a function of wavelength: $CD=a+b\lambda$, wherein $\lambda$ is the wavelength, a and b—coefficients, a is the mean dispersion, and b is the slope. The TODC 117 includes two groups of DCFs. The first group, formed by one or more DCFs, each connected for propagating and compensating all signals of all channels together, may be thought of as compensating the mean dispersion which happens in the span fiber. The chromatic dispersion is almost same for all the channels, and differs from channel to channel due to the slope effect. The second group of DCFs is for compensating CD in signals on per-channel basis. The DCFs of the second group are designed for compensating the dispersion which happens in tails, and the chromatic dispersion slop mismatch between the span fiber and the DCFs. It should be noted that the mean dispersion may be only partially compensated in the DCFs of the first group; a portion of the mean dispersion may be compensated in the DCFs of the second group, on per-channel basis.

The TODC 117 has a first switch 610 configurable for directing all signals in the plurality of optical channels to a first CD compensation fiber 620, in a first mode of operation, and for bypassing the first CD compensation fiber 620 when the switch is in a second mode of operation. The first fiber 620 represents the first group of fibers. The first switch 610 may be a 2×2 switch.

The TODC 117 includes a tunable optical switch 630 configurable for directing an optical signal in any of the plurality of optical channels to one of the plurality of fibers of the second group, dependent on a central wavelength of the optical signal. The second group includes a plurality of optical fibers, illustrated by fibers 641-644. Of course, the second group may include more than 4 fibers, e.g. 8, 12, 24, 36 fibers. Preferably, the dispersion compensation values associated with the fibers of the second group differ from one another, at least most of them.

The WSS switch 630 is a 1×M wavelength selective switch. By way of example, the WSS 630 switch may be 1×8, 1×9, or 1×16 switch. Preferably, all the fibers connected to the M output ports of the switch 630 are different in terms of the CD compensation values from one another, N=M. However, in a less preferable embodiment N may be equal to M−1 or M−2.

The TODC 117 may also include a fiber mirror 650 for reflecting each signal propagating through a particular fiber of the second group of fibers back into that fiber and further to the fiber(s) of the first group such as the first fiber 620 and a second fiber 660 (FIG. 6), if the switch 610 and switch 670 (FIG. 6) are so configured. Through the circulator 680, the at least partially compensated signal returns into the optical system.

The first switch 610 is connected serially with the tunable optical switch 630, so that all signals of all channels enter and exit the first switch 610 and also enter and exit the tunable switch 630. That enables combining CD compensation provided by any one of the plurality of optical fibers 641-644 and CD compensation provided by the first optical fiber 620.

The first and second groups of fibers are distinct in the sense that no fiber belongs to both groups. The difference between the first and second groups of compensation fibers is that (1) each fiber of the first group is connected for propagating signals of all channels simultaneously or being bypassed by all signals simultaneously, dependent on the mode of operation of the compensator, whereas (2) each fiber of the second group is connected to a WSS and receives one or more channels dependent on their wavelengths.

In the second group of compensation fibers, the least of the dispersion values is preferably less than a predefined resolution and each of other dispersion values is greater than its preceding dispersion value by no more than the predefined resolution, when the dispersion values are arranged in increasing order. In other words, the second group of fibers connected to the WSS 630 includes N fibers such that CD compensation values associated with these fibers differ from one another, $DCF_1<DCF_2<\ldots<DCF_N$, wherein each increment $\Delta_1=DCF_1$ and $\Delta_i=DCF_i-DCF_{i-1}$, $i=2\ldots N$, is no greater than the predefined resolution R.

Preferably, in order to achieve higher resolution with less resources, the fiber lengths are such that the $DCF_i$ values are equidistant, i.e. increments $\Delta_i$, $i=2\ldots N$, are equal to the resolution R; $\Delta_1=DCF_1$ may be R/2.

Advantageously, the compensator enables a broad spectrum of compensation values, including the range $D_1$ to $D_N$, related to the bypassing mode of the first switch, and the range $D+D_1$ to $D+D_N$.

In one embodiment, the first optical fiber has a dispersion compensation value D such that the greatest of dispersion values $D_N$ associated with the plurality of optical fibers in the second group is less than the least of dispersion values formed by adding the dispersion value D associated with the first optical fiber to the dispersion values $D_1\ldots D_N$ associated with the plurality of optical fibers by no more than the predefined resolution R. In other words, $D_N<D+D_1$ so as to provide continuity between the two ranges of compensation values, which is associated with zero CD compensation tolerance. The higher modulation speed, the lower compensating tolerance.

Figure 6:
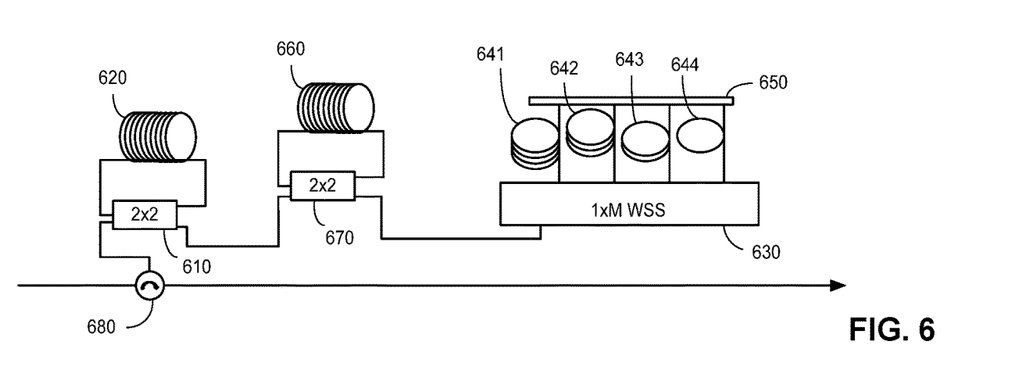
FIG. 6 is a schematic diagram of an embodiment of the compensator.

FIG. 6 illustrates an embodiment of the compensator 117. Differently from the embodiment illustrated in FIG. 5, there is a second switch 670, preferably a 2×2 switch, and a second fiber DCF 660, also for propagating and compensating all signals together. The second fiber 660 belongs to the first group of fibers, together with the first fiber 620. All the switches are connected serially for combining the compensation provided by each fiber of the first group, each fiber of the first group may be used or bypassed, and one of the fibers of the second group, selected dependent on the central wavelength of a signal being compensated.

Figure 7:
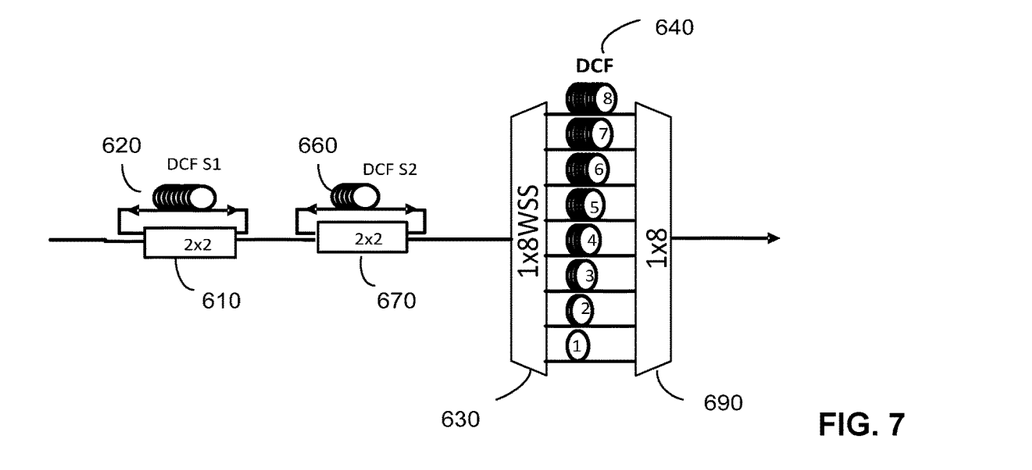
FIG. 7 is a schematic diagram of an embodiment of the compensator.

FIG. 7 illustrates an embodiment of the compensator 117. Differently from the embodiment illustrated in FIG. 6, there is no mirror 650. Instead, the compensator includes an optical combiner 690, for combining the signals propagating in the plurality of fibers into a broadband signal which will be provided to the optical system; the optical combiner 690 is preferably a WSS, may also be a 1×M combiner. The second 2×2 switch 670 and the second DCF fiber 660 are optional as discussed with reference to FIGS. 5 and 6.

By way of example, the embodiment shown in FIG. 7 may have the first group of DCF fibers described by dispersion compensation values $DCF_{S1}=400$ ps and $DCF_{S2}=800$ ps. Alternatively, the first group may include fibers associated with compensation values of 200, 400, and 800 ps.

The second group of fibers may include 8 DCF fibers 640, with lengths described by dispersion values $DCF_1=0$ ps; $DCF_2=50$ ps; $\ldots DCF_8=350$ ps. The variety of combinations of the ten DCF coils forms Chromatic Dispersion compensation values from 0 ps to 1550 ps, which covers 0 to 80 km SMF fiber with 50 ps resolution (½ of 25 G PAM4 Chromatic Dispersion tolerance).

The same lengths of fibers, when used in the embodiment of FIG. 5, will provide compensation values two times higher than in the compensator of FIG. 7, because of the return path of light through the same fibers. Alternatively, the fibers in the compensator shown in FIG. 5 may be twice shorter than in the compensator shown in FIG. 7, though providing the same compensation.

The dispersion compensation fibers are preferably selected so as to compensate both the chromatic dispersion in the span and tails and chromatic dispersion slop match as much as possible, or at least with a predefined accuracy.

Figure 7A:
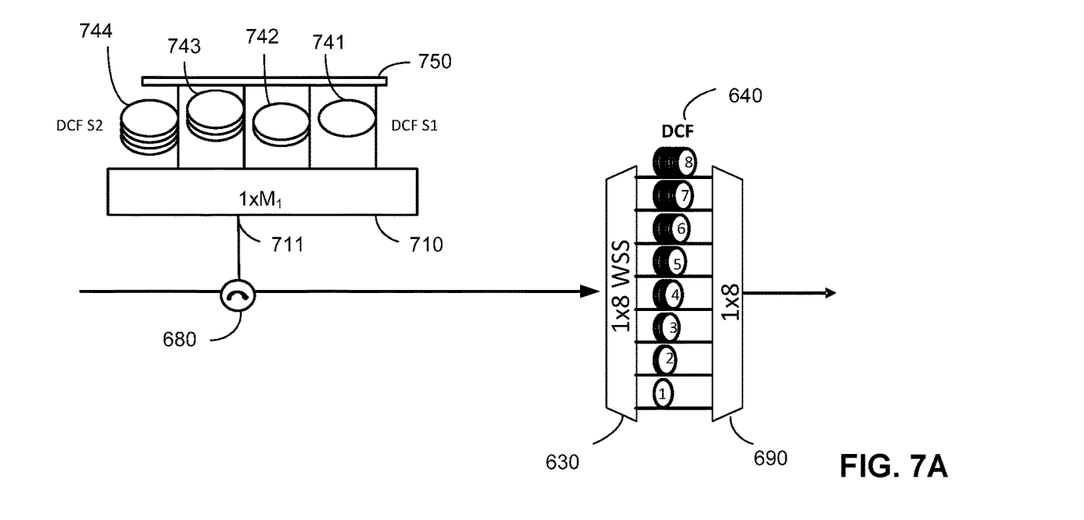
FIG. 7A is a schematic diagram of an embodiment of the compensator.

Yet another embodiment of the compensator is illustrated in FIG. 7A. A first switch 710 may direct all signals propagating in the plurality of optical channels to one of the optical fibers 741-744, which belong to the first group of fibers, i.e. each is used for compensation of all the channels simultaneously. In a first mode of operation, all the channels are directed to a first fiber 741, and the fibers 742-744 are bypassed. In a second mode of operation, all the channels are directed to a second fiber 742, while the first fiber 741 and fibers 743 and 744 are bypassed, and so on. The first switch 710 may be a configurable 1×$M_1$ switch, i.e. have $M_1$ output ports. While FIG. 7A shows $M_1=4$, another number of output ports may be envisioned. In the embodiment shown in FIG. 7A, all the signals of all the channels enter the switch 710 through an input port 711, are directed by the 710 to one of the fibers 741-744 for propagating together, exit through one of the $M_1$ ports, are reflected by a mirror 750 to the same of the $M_1$ ports, exit the switch 710 through the port 711, and are further directed to the switch 630.

The compensator illustrated in FIG. 7A has a switch 630, which is a tunable optical switch, configurable for directing an optical signal in any of the plurality of optical channels to one of the plurality of fibers of the second group, dependent on a central wavelength of the optical signal. Differently from the switch 710 which directs all the light to one of the output ports, the WSS 630 is configured on per-channel basis, for directing each channel to a particular port connected to a corresponding fiber of the second group, though it is possible that two channels may be directed to a same output port.

The compensator illustrated in FIG. 7A has another switch 690 for combining all the channels together into a broadband signal, as in FIG. 7. The combiner 690 is optional and may be replaced with a mirror such as the mirror 650 (FIG. 6).

With reference to FIG. 7A, the mirror 750 is optional, and may be replaced with another 1×$M_1$ switch (not shown), the same way as the switch 690 (FIG. 7) replaces the mirror 650 (FIG. 6).

In the compensator 117 (FIGS. 5-7A) the first switch (610 or 710), the optional second switch 670, and the WSS 630 are connected so as to enable combining CD compensation provided by any one fiber of the second group (640, 641-644) and CD compensation provided by any fiber of the first group, e.g. the first optical fiber (620, 741), e.g. the switches are connected serially as illustrated in FIGS. 5-7A.

While the drawings are described so that the signals initially enter the first switch and then the WSS, any order of the switches is possible.

Advantageously, the compensator provides dispersion compensation in each particular channel, taking into account the remote tail of that channel. Additionally, using compensation fibers of the first group for compensating all the channels together requires significantly less compensation fiber than it would be used in separate compensators each for a particular channel.

The method and the compensator disclosed herein may be used for compensating chromatic dispersion for optical signals in the range of wavelengths from 1528 to 1620 nm.

The method may be implemented in a chromatic dispersion compensation system, within an optical communication system such as DCI illustrated in FIG. 3. The dispersion compensation system includes a BER measurement unit also referred to as a BER monitor 300, and an optical time-domain reflectometer (OTDR) 310, both for estimating dispersion in the span and tail fiber, respectively. Preferably, the BER monitor 300 and the OTDR 310 share the use of the transmitter 410 and receiver 420. The compensation system further includes a tunable dispersion compensator (TODC) 117 for compensating the span and tail dispersion.

The compensation system also includes a control subsystem for controlling and coordinating the BER measurement unit, the OTDR, and the TODC, wherein the TODC provides dispersion compensation based on the measurements performed by the BER and OTDR units. The control subsystem of the chromatic dispersion compensation system may include one or more hardware microprocessors, FPGA and/or ASIC logic. The control subsystem may control the tunable transmitter of the BER equipment and the tunable optical filter of the OTDR, collect their data, and use the data for configuring the compensator. The control system may include computer readable memory with instructions stored therein; the instructions when executed cause the one or more microprocessors to implement the method.

Provisioning, or setting the configuration, of the chromatic dispersion compensator in an optical system will be discussed with reference to FIGS. 8 and 9.

Figure 8:
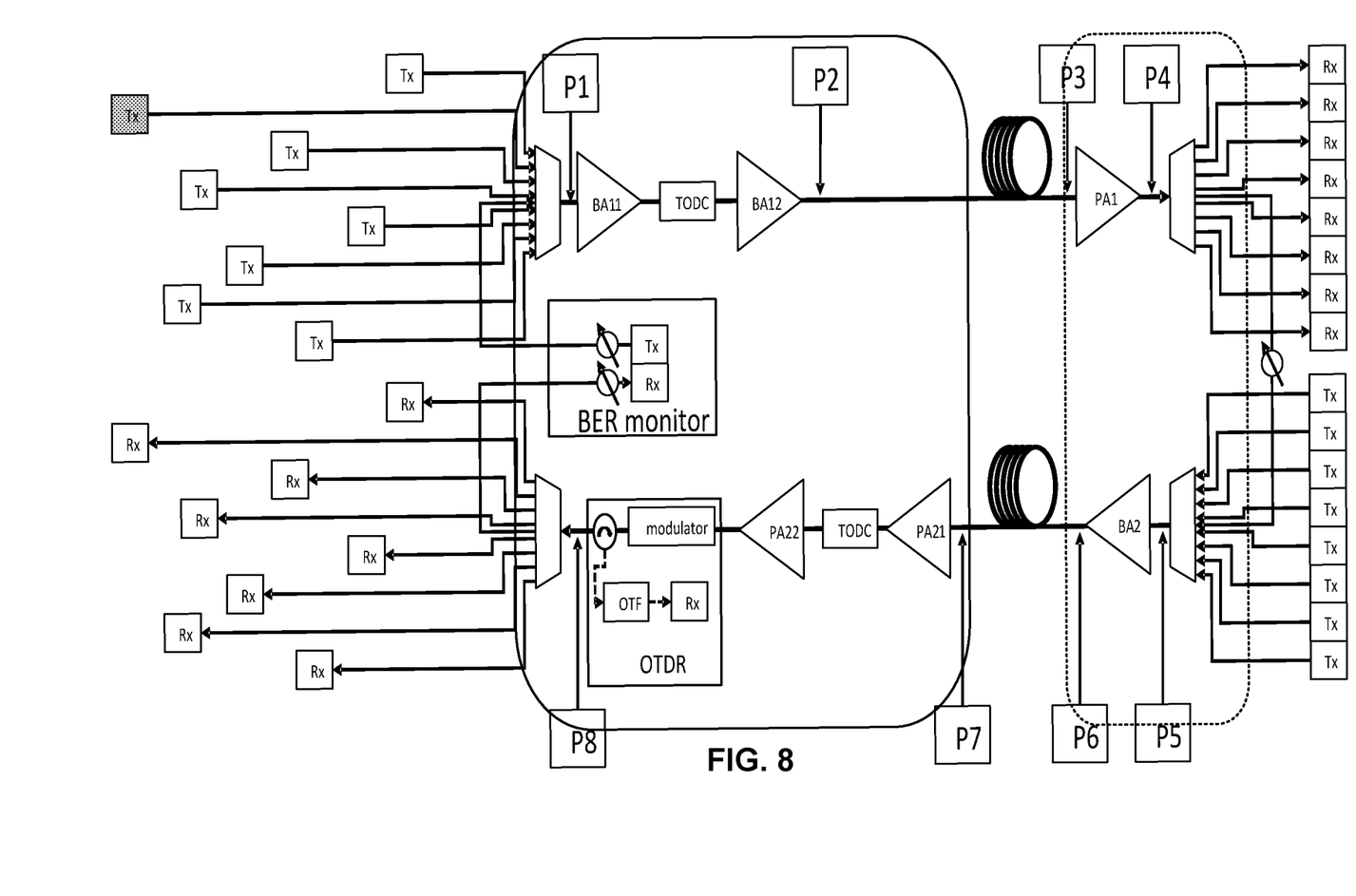
FIG. 8 illustrates power budget and amplifier gain in the optical system discussed above with reference to FIG. 3.

FIG. 8 illustrates power budget and amplifier gain in the optical system discussed above with reference to FIG. 3, wherein equipment constants and parameters to be achieved in operation include:

$P_1$ is the input power to the input port of amplifier BA11,
$P_2$ is the power from amp BA12, the power launch to transform fiber,
$P_3$ is the input power to the input port of amplifier PA1,
$P_4$ is the output power from the output port of amplifier PA1,
$P_5$ is the input power to the input port of amplifier BA2,
$P_6$ is the power from amp BA2, the power launch to transform fiber, P2=P6,
$P_7$ is the input power to the input port of amplifier PA21,
$P_8$ is the output power from the output port of amplifier PA22,
$P_{tx}$ is output power of the Tx,
$P_{rx}$ is receiving power of the Rx,
$IL_{mux}$ is insertion loss of the Mux/Demux, and
$IL_{span}$ is insertion loss of span fiber.

The following formulae describe relationships of the above parameters:

$$P_{Rx} = P_4 - IL_{MUX}$$
$$= P_3 + G_{PA1} - IL_{MUX}$$
$$= P_2 - IL_{Span} + G_{PA1} - IL_{MUX}$$
$$= P_1 + G_{BA1} + IL_{Span} + G_{PA1} - IL_{MUX}$$
$$= P_{Tx} - IL_{Remote} - IL_{MUX} + G_{BA1} + IL_{Span} + G_{PA1} - IL_{MUX}$$

$$P_{Rx} = P_8 - IL_{Remote} - IL_{MUX}$$
$$= P_7 + G_{PA2} - IL_{Remote} - IL_{MUX}$$
$$= P_6 - IL_{Span} + G_{PA2} - IL_{Remote} - IL_{MUX}$$
$$= P_5 + G_{BA2} - IL_{Span} + G_{PA2} - IL_{Remote} - IL_{MUX}$$
$$= P_{Tx} - IL_{MUX} + G_{BA2} - IL_{Span} + G_{PA2} - IL_{Remote} - IL_{MUX}$$

$$G_{BA1} = G_{BA11} - IL_{TODC} + G_{BA12}$$

$$G_{PA2} = G_{PA21} - IL_{TODC} + G_{PA22}$$

Figure 9:
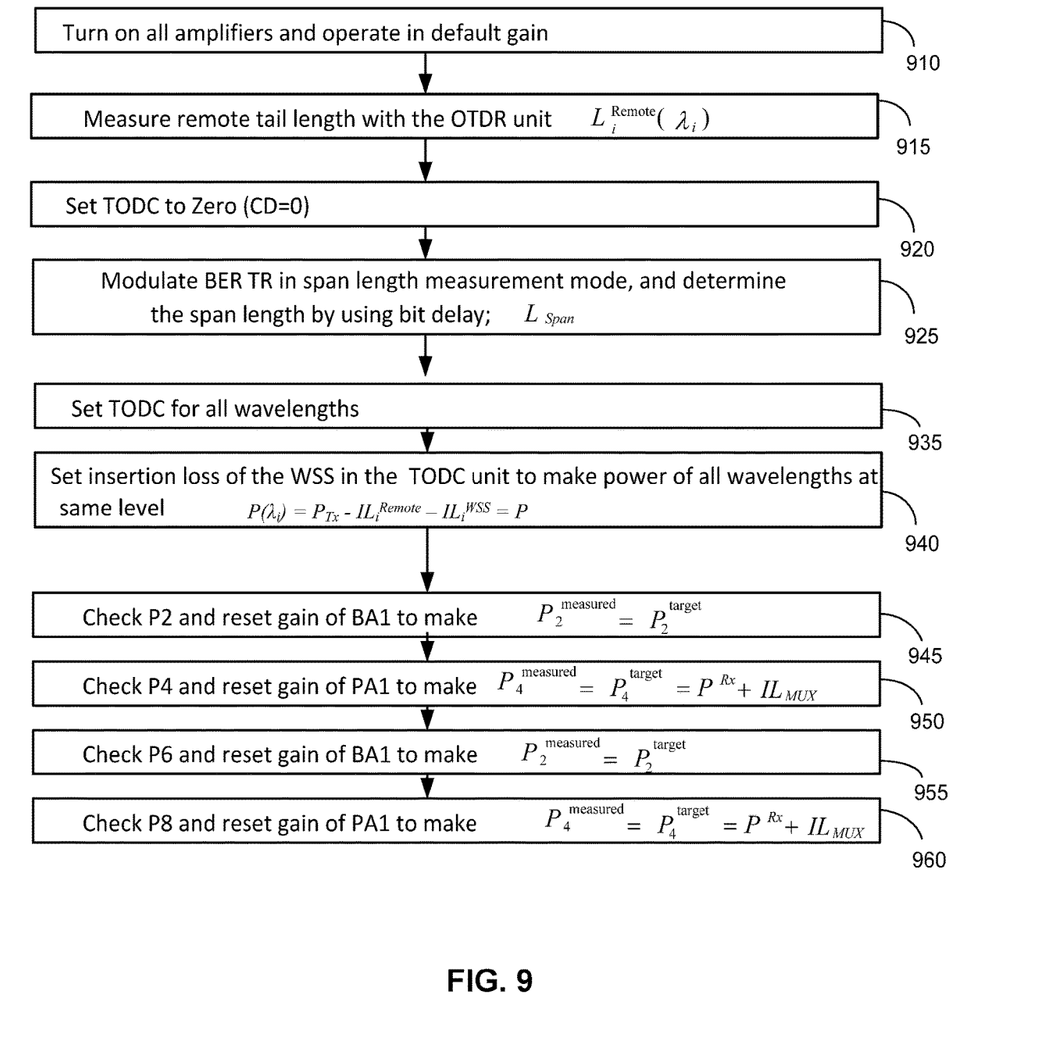
FIG. 9 is a flow chart of a method for configuring the compensator.

FIG. 9 illustrates one embodiment of the method discussed above with reference to FIG. 2.

The provisioning steps are shown in FIG. 9, and include operating (910) the optical system in predetermined amplifier gain according to the designed span length while all amplifiers are turned on, and measuring (915) remote tail lengths with the OTDR unit 310, for each channel.

The method also includes setting (920) TODC 117 to a least possible value, i.e. as close to zero as possible. For the embodiment illustrated in FIGS. 6 and 7: set the two 2×2 switches 610 and 670 to bypass the fibers of the first group, i.e. exclude $DCF_{S1}$ and $DCF_{S2}$ from the optical path of the signals, and set the WSS 630 to switch all the wavelengths to port 1 connected to a compensation fiber associated with the least compensation value among the fibers of the second group, $DSF_1$ In the embodiment illustrated in FIG. 7A, it is preferable to have one port (not shown) of the 1×$M_1$ optical switch 710 with no DCF connected thereto. Alternatively, the first switch 710 may be configured to direct all optical signals to the compensation fiber of the first group which would provide the least compensation value, the fiber 741, and set the WSS 630 to switch all the wavelengths to port 1 connected to a compensation fiber associated with the least compensation value among the fibers of the second group, $DSF_1$.

The method includes span length measurement (or estimation) using the BER unit. In the span length measuring mode, the modulation frequency of TX 410 should be much lower than in the BER measuring mode to achieve proper distance resolution and measurement range.

The provisioning also includes modulating (925) the BER Tx in BER monitoring mode, and performing span CD estimation. The BER TR/Tx 410 is preferably tunable across all channels. The BER TR/Tx 410 transmits and modulates the light in the span length measurement mode, and determines the span length using the bit delay as discussed above so as to obtain $L_{span}$. The signal from Tx 410 for CD estimation should be more sensitive to the CD tolerance than the system signal, for example, have higher modulation frequency or wider bandwidth.

Figure 10:
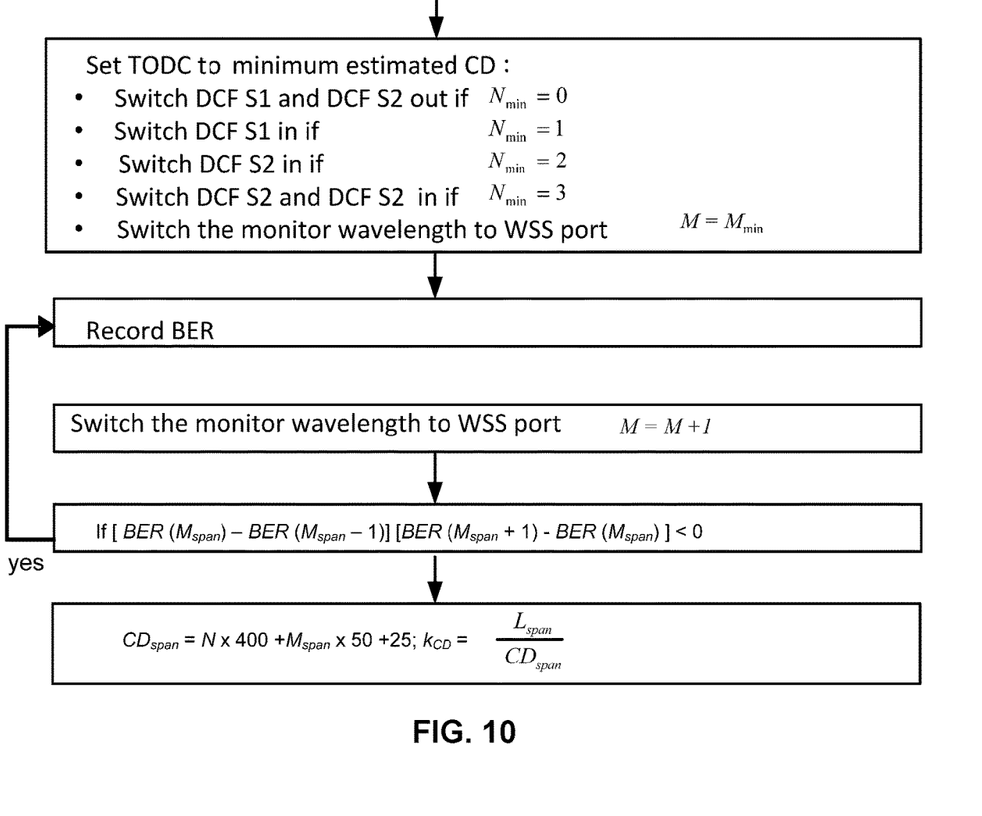
FIGS. 10-12 illustrate examples of compensator configuration.
Figure 12:
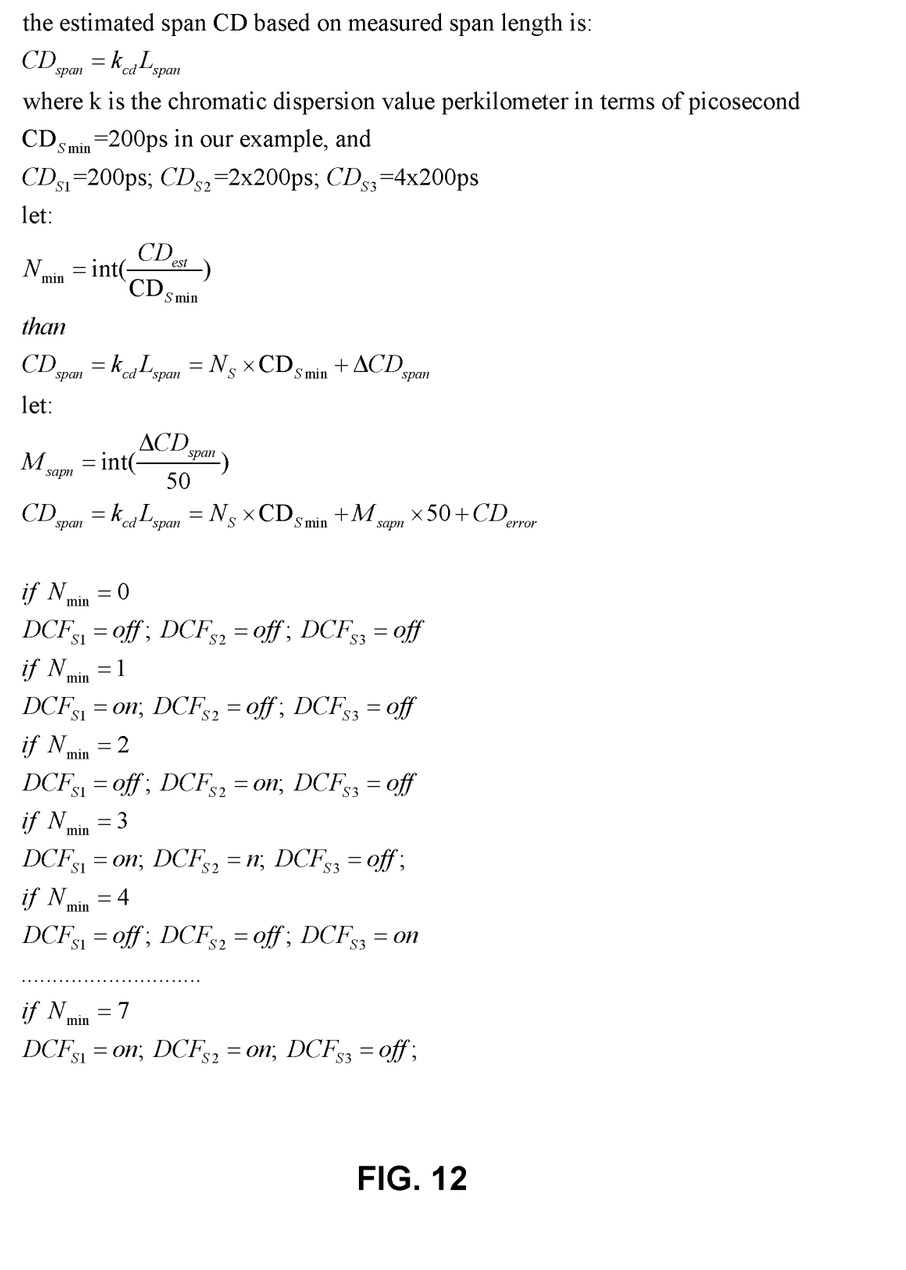

Random test signals (e.g. 1011000010011111000101010101010101) from Tx 410 passes through Mux 111, EDFA 113, TODC 117, span fiber 121, EDFA 119, DeMux 110, Mux 111, EDFA 123, span fiber 120, TODC 125, EDFA 115, Demux 110 and back to the BER monitor 300, to receiver Rx 420. The received signal and sent signal then be compared and BER (bit error rate) is estimated (in ideal case i.e. zero CD tolerance, the BER should be zero). The measured BER then be used to adjust compensator 117, until minimum BER value is achieved or approximated with a predefined accuracy. FIGS. 10 and 12 illustrate Span CD estimation (925, FIG. 9), wherein $N_{min}$ is the integer part of the ratio of $CD_{span}$ to the compensation value associated with the S1 fiber of the first group, assuming $S_2=2S_1$; M refers to a port in WSS 630, $M_{min}$ is the port where the shortest DCF is connected.

Figure 11:
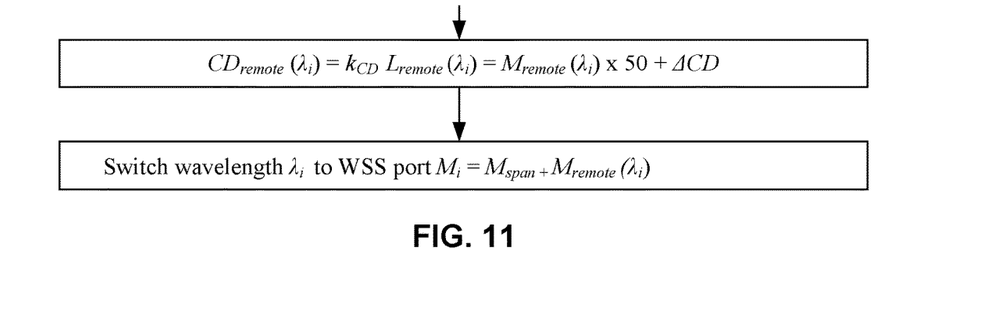

Turning back to FIG. 9, the provisioning further includes setting (935) TODC for all wavelengths corresponding to signals in all channels propagating in the system. FIG. 11 illustrates setting (935) the TODC for the above example.

The method includes accounting (940) to adjust insertion losses of the WSS in the TODC unit to make power of all wavelengths at same level, $P(\lambda_i)=P_{Tx}-IL_i^{Remote}-IL_1^{WSS}=P$. Subsequently, gain values are reset (945-960).

With reference to FIG. 2, determining (210) one or more parameters related to chromatic dispersion in the span fiber corresponds to step 925 (FIG. 9), and determining (220) a remote tail length for each of the plurality of optical channels corresponds to step 915 (FIG. 9).

Steps 925-960 relate to configuring the compensator 117, including configuring the first switch 610 or 710, the WSS 630, and the optional second switch 670, for the compensator 117, in operation, to compensate (230, FIG. 2) the chromatic dispersion of the span fiber and tail chromatic dispersion on per-channel basis. All or at least some of the method steps may be performed using the control subsystem.

The invention claimed is:

1. A method of chromatic dispersion (CD) compensation in an optical system comprising span fiber for propagating optical signals in a plurality of optical channels, and a plurality of tails, each for propagating an optical signal in one of the plurality of optical channels, the method comprising:

determining one or more parameters related to chromatic dispersion in the span fiber, determining a remote tail length for each of the plurality of optical channels, and compensating the chromatic dispersion of the span fiber and tail chromatic dispersion on per-channel basis using a tunable compensator, wherein the one or more parameters related to chromatic dispersion in the span fiber and the remote tail length for signals in each of the plurality of optical channels are used for configuring the tunable compensator, wherein the tunable compensator comprises:

a plurality of CD compensation fibers having dispersion values associated with the plurality of CD compensation fibers, wherein the least of the dispersion values is less than a predefined resolution and each of other dispersion values is greater than its preceding dispersion value by no more than the predefined resolution, when the dispersion values are arranged in increasing order;

a tunable optical switch configurable for directing an optical signal in any of the plurality of optical channels to one of the plurality of fibers, dependent on a central wavelength of the signal;

a first switch configurable for directing all signals in the plurality of optical channels to a first CD compensation fiber, in a first mode of operation, and for bypassing the first CD compensation fiber in a second mode of operation; and, the first CD compensation fiber, wherein the first CD compensation fiber is distinct from the plurality of CD compensation fibers, and wherein the first switch and the tunable optical switch are connected so as to enable combining CD compensation provided by the first CD compensation fiber and CD compensation provided by any one of the plurality of CD compensation fibers.

2. The method as defined in claim 1, wherein the first switch is a 2×2 switch.

3. The method as defined in claim 2, wherein the tunable compensator comprises a second CD compensation fiber and a second 2×2 switch for providing signals in the plurality of optical channels to the second CD compensation fiber or bypassing the second CD compensation fiber.

4. The method as defined in claim 2, wherein the tunable optical switch is a 1×M switch.

5. The method as defined in claim 4, wherein the tunable compensator comprises a M×1 combiner for combining the signals propagating in the plurality of DC compensation fibers into a broadband signal.

6. The method as defined in claim 4, wherein the tunable compensator comprises a mirror for reflecting the signals propagating in the plurality of DC compensation fibers back into respective fibers.

7. The method as defined in claim 1, wherein the first switch is a 1×M1 switch, M1=2 . . . 8.

8. The method as defined in claim 7, wherein the tunable compensator comprises a mirror for reflecting a signals propagating in the first DC compensation fiber back into first DC compensation fiber.

9. The method as defined in claim 2, wherein each of the dispersion values associated with the plurality of DC compensation fibers, other than the least value, is greater than its preceding dispersion value by the predefined resolution.

10. The method as defined in claim 9, wherein the least of the dispersion values associated with the plurality of DC compensation fibers is equal to a half of the predefined resolution.

11. The method as defined in claim 9, wherein the predefined resolution is 50 ps.

12. The method as defined in claim 4, wherein the plurality of fibers comprises N≥7 fibers, and M is equal to N, N+1, or N+2.

13. The method as defined in claim 12, wherein N=M=8, the dispersion values associated with the first and second CD compensation fibers are 400 and 800 ps, and the predefined resolution is 50 ps.

14. The method as defined in claim 1, wherein the first CD compensation fiber has a length such that the greatest of dispersion values associated with the plurality of CD compensation fibers is less than the least of dispersion values formed by adding a dispersion value associated with the first CD compensation fiber to the dispersion values associated with the plurality of CD compensation fibers by no more than the predefined resolution.

* * * * *